(12) United States Patent
Simon et al.

(10) Patent No.: US 11,840,837 B2
(45) Date of Patent: Dec. 12, 2023

(54) ROOFING PRODUCTS WITH IMPROVED NAIL ZONE, ROOFING SYSTEMS AND METHODS FOR INSTALLING THEM

(71) Applicant: CertainTeed LLC, Malvern, PA (US)

(72) Inventors: Mark W. Simon, Phoenixville, PA (US); Robert L. Jenkins, Honey Brook, PA (US); Michael J. Lembo, Souderton, PA (US); Gregory F. Jacobs, Oreland, PA (US); Ying Wang, Westborough, PA (US); Matthew O'Boyle, Malvrn, PA (US); Alexandre Alberto Arruda Pecora, Malvern, PA (US)

(73) Assignee: Certain Teed LLC, Malvern, PA (US)

( * ) Notice: Subject to any disclaimer, the term of this patent is extended or adjusted under 35 U.S.C. 154(b) by 0 days.

(21) Appl. No.: 17/119,620

(22) Filed: Dec. 11, 2020

(65) Prior Publication Data

US 2021/0180325 A1    Jun. 17, 2021

Related U.S. Application Data

(60) Provisional application No. 62/947,943, filed on Dec. 13, 2019.

(51) Int. Cl.
*E04D 1/28* (2006.01)
*E04D 1/26* (2006.01)
(Continued)

(52) U.S. Cl.
CPC ............... *E04D 1/28* (2013.01); *B32B 3/08* (2013.01); *B32B 5/16* (2013.01); *B32B 7/12* (2013.01);
(Continued)

(58) Field of Classification Search
CPC .... E04D 1/28; E04D 1/08; E04D 1/26; E04D 2001/005; B32B 5/16; B32B 7/12; B32B 2419/06
See application file for complete search history.

(56) References Cited

U.S. PATENT DOCUMENTS 2,113,644 A    4/1938   Bollaert
2,139,820 A    12/1938  Graham
(Continued)

OTHER PUBLICATIONS

3M, "VHB(TM) Tapes—Technical Data," Nov. 2015.
(Continued)

*Primary Examiner* — Brian E Glessner
*Assistant Examiner* — Daniel J Kenny
(74) *Attorney, Agent, or Firm* — McDonnell Boehnen Hulbert & Berghoff LLP (57) ABSTRACT

The present disclosure relates generally to roofing products, for example, shingles suitable for covering and protecting the roofs of houses, buildings, and other structures. The present disclosure relates more particularly to a roofing shingle including an upper edge, a lower edge, a first end, a second end, a headlap section, and an exposed section. A nail zone extends across the roofing shingle from the first end to the second end within the headlap section. The roofing shingle includes a top shingle layer including a top surface and a bottom surface. A reinforcement strip is secured to the bottom surface of the top shingle layer and overlaps with the nail zone. Further, a self-sealing material is disposed within the nail zone and is configured to form a seal around a mechanical fastener that punctures the roofing shingle in order to secure the roofing shingle to an underlying roof structure.

17 Claims, 10 Drawing Sheets

(51) Int. Cl.
 *B32B 3/08* (2006.01)
 *B32B 7/12* (2006.01)
 *B32B 5/16* (2006.01)
 *E04D 1/00* (2006.01)
(52) U.S. Cl.
 CPC ............ *E04D 1/26* (2013.01); *B32B 2419/06* (2013.01); *E04D 2001/005* (2013.01)

(56) References Cited

U.S. PATENT DOCUMENTS

| | | | |
|---|---|---|---|
| 2,347,250 A | 4/1944 | Burnett | |
| 3,252,257 A | 5/1966 | Price | |
| 4,538,311 A * | 9/1985 | Hall | A47C 27/085 |
| | | | 4/584 |
| 5,611,186 A | 3/1997 | Weaver | |
| 5,822,943 A | 10/1998 | Frankoski | |
| 6,397,546 B1 | 6/2002 | Malarkey | |
| 6,471,812 B1 | 10/2002 | Thompson | |
| 6,524,682 B1 | 2/2003 | Leavell | |
| 6,869,981 B2 | 3/2005 | Fewkes | |
| 6,990,779 B2 | 1/2006 | Kiik | |
| 7,204,063 B2 | 4/2007 | Kandalgaonkar | |
| 7,537,820 B2 * | 5/2009 | Kalkanoglu | B32B 11/02 |
| | | | 428/323 |
| 7,578,108 B2 * | 8/2009 | Swanson | E04D 1/34 |
| | | | 52/553 |
| 7,811,630 B2 | 10/2010 | Hong | |
| 7,836,654 B2 | 11/2010 | Belt | |
| 8,156,704 B2 | 4/2012 | Belt | |
| 8,240,102 B2 | 8/2012 | Belt | |
| 8,438,796 B2 | 5/2013 | Shiao | |
| 8,557,366 B2 | 10/2013 | Harrington, Jr. | |
| 8,607,521 B2 | 12/2013 | Belt | |
| 8,623,164 B2 | 1/2014 | Belt | |
| 8,668,954 B2 | 3/2014 | Hong | |
| 8,722,140 B2 | 5/2014 | Shiao | |
| 8,752,351 B2 | 6/2014 | Belt | |
| 8,989,875 B2 | 2/2015 | Kalkanoglu | |
| 8,991,130 B2 | 3/2015 | Belt | |
| 9,121,178 B2 | 9/2015 | Belt | |
| 9,422,719 B2 | 8/2016 | Shiao | |
| 9,624,670 B2 | 4/2017 | Belt | |
| 9,657,478 B2 | 5/2017 | Belt | |
| 10,094,115 B2 | 10/2018 | Shiao | |
| 10,138,631 B2 | 11/2018 | Schmidt | |
| 10,308,448 B2 | 6/2019 | Belt | |
| 10,322,889 B2 | 6/2019 | Belt | |
| 10,907,354 B2 * | 2/2021 | LaTorre | C08L 95/00 |
| 11,021,876 B2 * | 6/2021 | Grubka | B32B 7/14 |
| 2001/0010141 A1 | 8/2001 | Folkersen | |
| 2007/0071946 A1 | 3/2007 | Zickell | |
| 2018/0186694 A1 | 7/2018 | Lante | |
| 2018/0194684 A1 | 7/2018 | Panzarella | |
| 2019/0300449 A1 | 10/2019 | Panzarella | |
| 2019/0323240 A1 | 10/2019 | Gomes | |

OTHER PUBLICATIONS

Excerpt from D. Satas, "10., Dynamic Mechanical Analysis and Adhesive Performance," in D. Satas, Ed., "Handbook of Pressure Sensitive Adhesive Technology," 3rd ed., pp. 171-185 (1989).

* cited by examiner

ROOFING PRODUCTS WITH IMPROVED NAIL ZONE, ROOFING SYSTEMS AND METHODS FOR INSTALLING THEM

CROSS-REFERENCE TO RELATED APPLICATIONS

This application claims the benefit of priority of U.S. Provisional Patent Application no. 62/947,943, filed Dec. 13, 2019, which is hereby incorporated herein by reference in its entirety.

BACKGROUND OF THE DISCLOSURE

1. Field of the Disclosure

The present disclosure relates generally to roofing products, for example, shingles suitable for covering and protecting the roofs of houses, buildings, and other structures. The present disclosure relates more particularly to roofing products having an improved nail zone.

2. Technical Background

Roofing shingles, such as asphalt shingles, are applied in courses over a roof to protect the roof structure from weather, particularly water. Most roofing shingles are secured to an underlying structure using nails. Typically, the roofing shingles are designed to have a designated area where the nails penetrate through the shingle to the underlying structure. In typical circumstances, nails that extend through the designated nail zone and to a sufficient depth in the roof structure will provide a secure and watertight roof.

On the other hand, the extension of a nail through the roofing shingle inherently creates a penetration through the shingle. This penetration both weakens the structure of the roofing shingle and forms a path where water could leak potentially through the shingle. Further, if the installer places the nail in the wrong location, the roofing shingle is even more vulnerable to a possible leak through the roof.

The present inventors have determined that a roofing shingle structure that has added durability and that includes additional protection against water leakage would be attractive to both builders and customers.

SUMMARY OF THE DISCLOSURE

In one aspect, the present disclosure provides a roofing shingle including an upper edge, a lower edge, a first end, a second end, a headlap section, and an exposed section below the headlap section, wherein a nail zone extends across the roofing shingle from the first end to the second end within the headlap section, the roofing shingle comprising:
  a top shingle layer including a top surface and a bottom surface;
  a reinforcement strip secured to the bottom surface of the top shingle layer and overlapping with the nail zone; and
  a self-sealing material disposed within the nail zone and configured to form a seal around a mechanical fastener that punctures the roofing shingle in order to secure the roofing shingle to an underlying roof structure.

In another aspect, the disclosure provides a method of producing a roofing shingle according the disclosure, the method comprising:
  providing the top shingle layer including the top surface and the bottom surface;
  providing the reinforcement strip as a carrier for the self-sealing material; and
  securing the reinforcement strip to the bottom surface of the top shingle layer.

In another aspect, the disclosure provides a roofing system comprising:
  a roof structure;
  a first roofing shingle according to the disclosure disposed on the roof structure;
  a first mechanical fastener securing the first roofing shingle to the roof structure, wherein the first mechanical fastener is disposed within the nail zone and passes through the top shingle layer and the reinforcement strip.

In another aspect, the disclosure provides a method of installing a roofing system according to the disclosure, the method comprising:
  positioning a first roofing shingle according to the disclosure on a roof structure;
  driving a first mechanical fastener through the nail zone of the first roofing shingle and into the roof structure so as to secure the first roofing shingle to the roof structure, wherein the first mechanical fastener passes through the top shingle layer and the reinforcement strip of the first roofing shingle.

Additional aspects of the disclosure will be evident from the disclosure herein.

BRIEF DESCRIPTION OF THE DRAWINGS

The accompanying drawings are included to provide a further understanding of the methods and devices of the disclosure, and are incorporated in and constitute a part of this specification. The drawings are not necessarily to scale, and sizes of various elements may be distorted for clarity. The drawings illustrate one or more embodiment(s) of the disclosure, and together with the description serve to explain the principles and operation of the disclosure.

DETAILED DESCRIPTION

As described above, the present inventors have noted that a penetration caused by nail through a roofing shingle inherently weakens the structure of the shingle and creates a penetration through the shingle. The present inventors have determined that a roofing shingle structure that has added durability and that includes additional protection against water leakage would be attractive to both builders and customers.

Accordingly, one aspect of the disclosure is a roofing shingle including an upper edge, a lower edge, a first end, a second end, a headlap section, and an exposed section below the headlap section. A nail zone extends across the roofing shingle from the first end to the second end within the headlap section. The roofing shingle includes a top shingle layer including a top surface and a bottom surface. A reinforcement strip is secured to the bottom surface of the top shingle layer and overlaps with the nail zone. Further, a self-sealing material is disposed within the nail zone and is configured to form a seal around a mechanical fastener that punctures the roofing shingle in order to secure the roofing shingle to an underlying roof structure.

Figure 1:
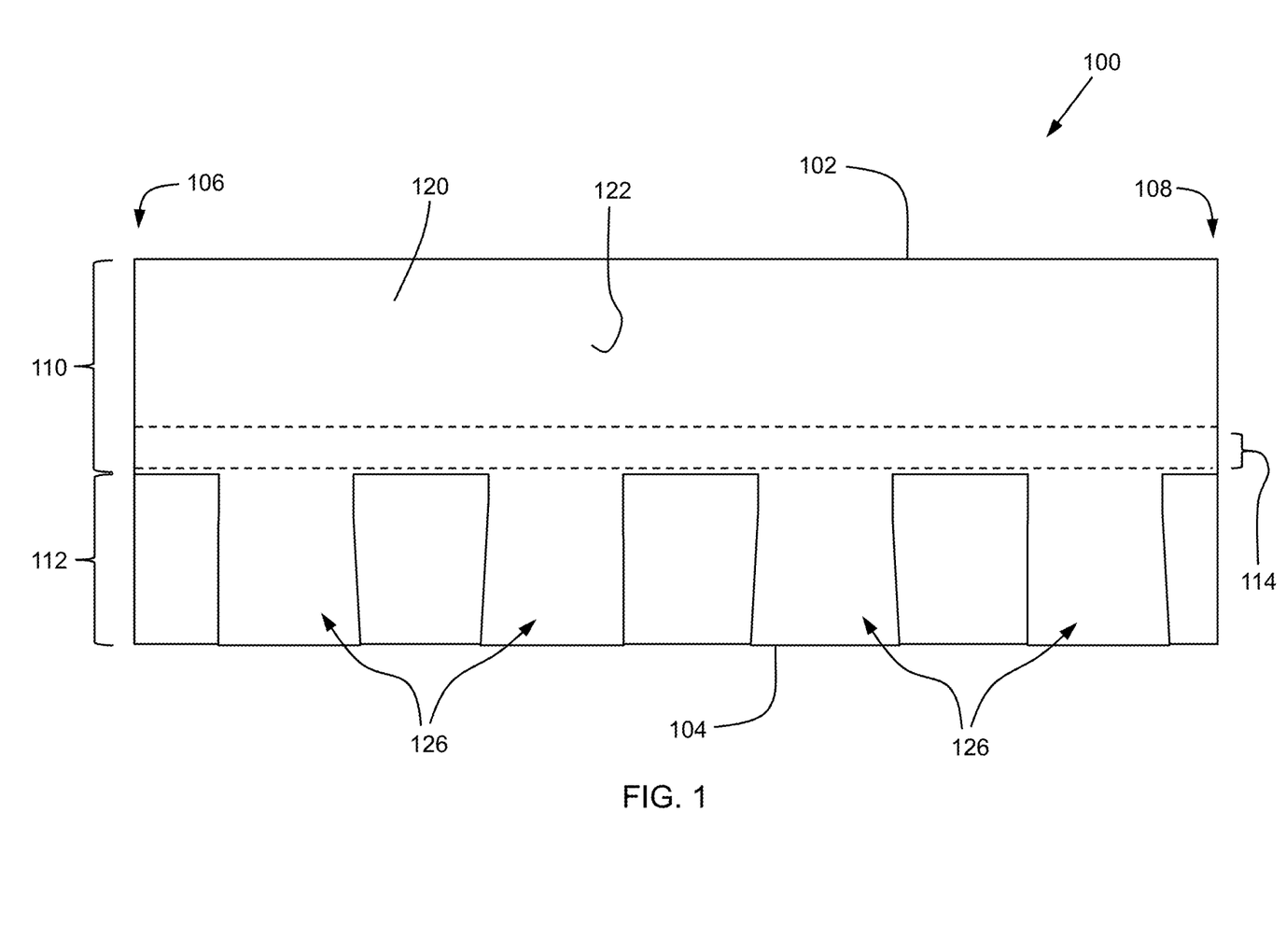
FIG. 1 is a schematic top view of a roofing shingle according to an embodiment of the disclosure.
Figure 2:
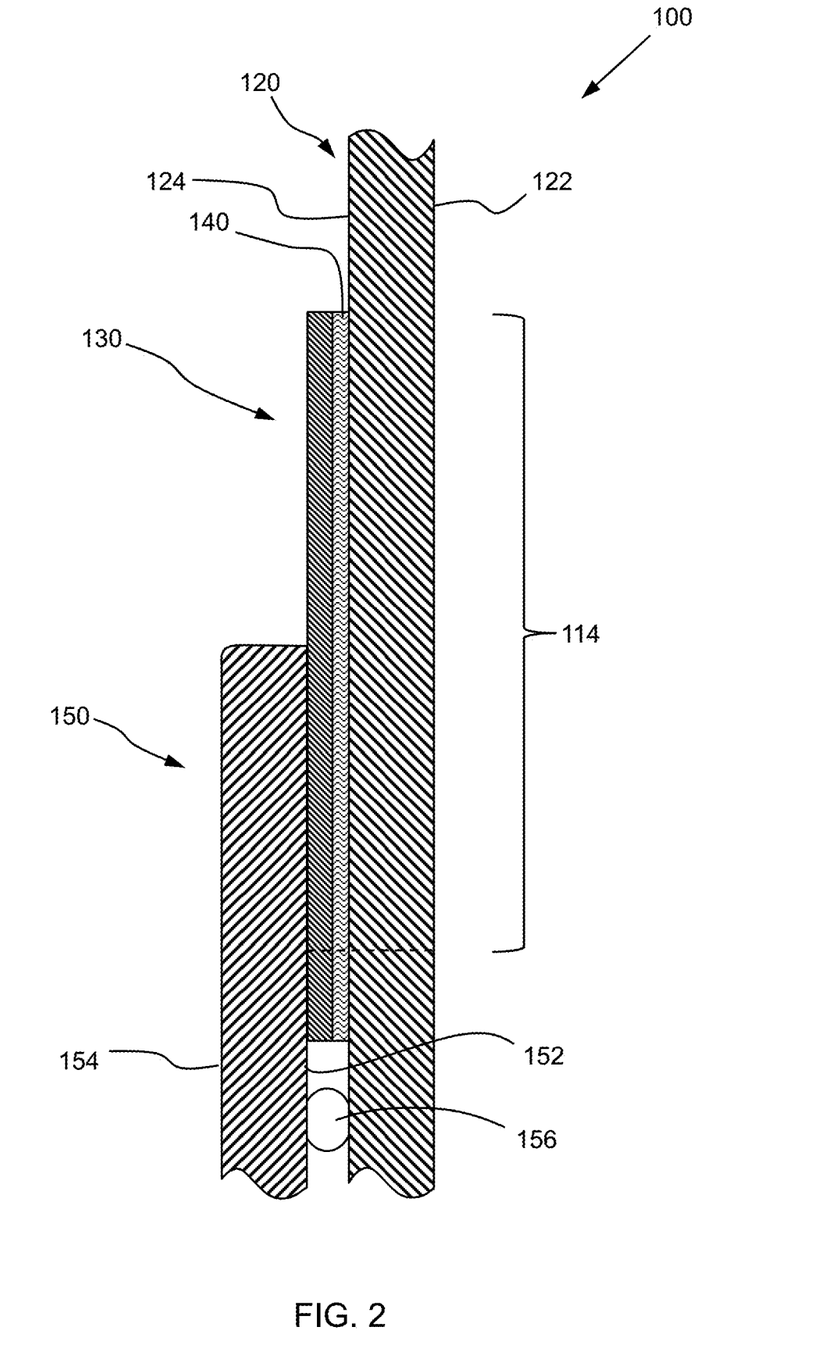
FIG. 2 is a detailed schematic side view of a portion of the roofing shingle of FIG. 1.
Figure 3:
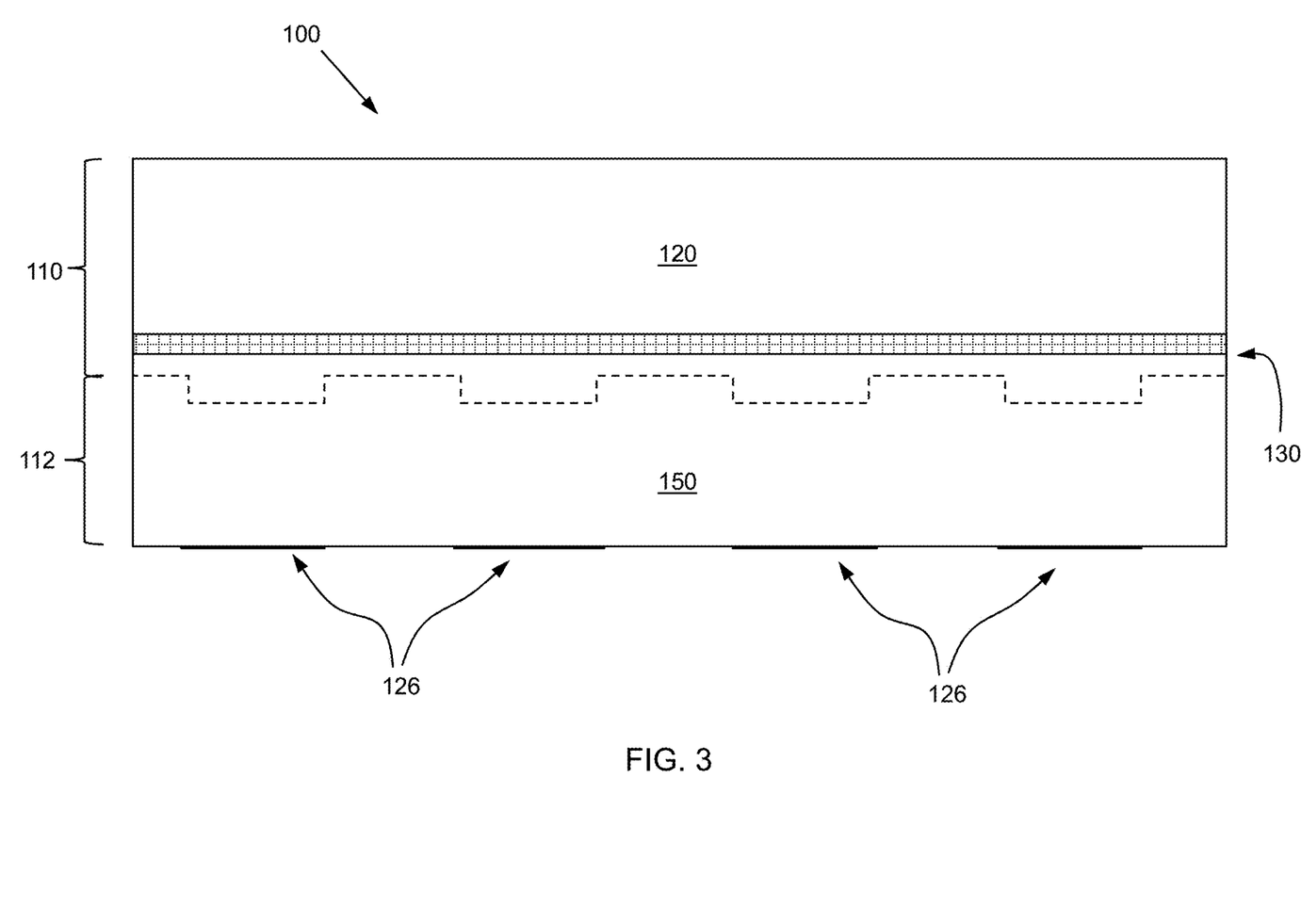
FIG. 3 is a schematic bottom view of the roofing shingle of FIG. 1.

Such a roofing shingle is shown in FIGS. 1-3. Roofing shingle 100 includes an upper edge 102, a lower edge 104, a first end 106 and a second end 108. Further, roofing shingle 100 has a headlap section 110 and an exposure section 112 below headlap section 110. As explained in more detail below, upon installation, the headlap section 110 may be covered by one or more additional roofing shingles that are part of another course of shingles disposed on top of roofing shingle 100. A nail zone 114 extends through headlap section 110 across the width of roofing shingle 100 from first end 106 to second end 108. Nail zone 114 is the portion of roofing shingle 100 that is configured to receive nails or other mechanical fasteners for securing roofing shingle 100 to an underlying roof structure. In some embodiments, the nail zone runs continuously from one end of the roofing shingle to the other, such as nail zone 114. In other embodiments, the nail zone is formed by intermittent sections where fasteners are intended to be placed.

Roofing shingle 100 also includes a top shingle layer 120 that extends across the width of roofing shingle 100 from first end 106 to second end 108. Further, top shingle layer 120 extends across the entire width of roofing shingle 100 along upper edge 102 and intermittently extends across roofing shingle 100 along lower edge 104, as explained in more detail below. FIG. 2 shows a detailed view of a cross-section of roofing shingle 100 in a vicinity of nail zone 114. As shown in FIG. 2, top shingle layer 120 includes a top surface 122 and a bottom surface 124.

Roofing shingle 100 further includes a reinforcement strip 130 that is secured to bottom surface 124 of top shingle layer 120. Thus, upon installation, the reinforcement strip 130 is disposed under top shingle layer 120. Reinforcement strip 130 overlaps with nail zone 114 and is configured to provide increased durability of roofing shingle 100 in the area of nail zone 114.

The terms top and bottom, as used herein, refer to the direction that is perpendicular to the angled underlying roof structure, such that a stack of two layers on the roof structure includes a bottom layer in contact with the underlying structure and a top layer that covers the bottom layer. In contrast, the terms upper and lower refer to the direction that is parallel to the roof structure with regard to elevation, such that water runs down the roof from an upper area of the roof to a lower area of the roof.

Roofing shingle 100 also includes a self-sealing material 140 that is disposed within the nail zone 114. The self-sealing material 140 is configured to form a seal around any mechanical fastener, such as a nail or staple, that punctures roofing shingle 100 within nail zone 114. Accordingly, when a mechanical fastener is used to secure roofing shingle 100 to a roof structure, any penetration formed through roofing shingle 100 can be closed by the seal formed around the shaft of the puncturing mechanical fastener.

In some embodiments the top shingle layer is formed of a base sheet that is covered with a bituminous material to form an asphalt shingle. The base sheet of the top shingle layer may be formed of a fibrous mat that holds the bituminous material. For example, in some embodiments the base sheet may be made of woven or non-woven glass fibers, polymeric fibers, or a combination of glass and polymeric fibers. In other embodiments, the base sheet is made of roofing felt that holds the bituminous material. Moreover, in some embodiments, the roofing shingle includes more than one shingle layer, as described in more detail below. In such embodiments, each of the shingle layers may include a base sheet according to the foregoing description.

In certain embodiments of the roofing shingle as otherwise described herein, the roofing shingle further includes roofing granules disposed on the top surface of the top shingle layer. The granules may provide color to the top surface of the roofing shingle and may protect the bituminous material contained in the base sheet of the top shingle layer. For example, in some embodiments the roofing granules are highly reflective to reduce the temperature of the roofing shingles. In other embodiments, the roofing granules include algae resistance to prevent growth on the roofing shingles. Further, in some embodiments, where the roofing shingle includes more than one layer, each of the shingle layers includes roofing granules on a respective top surface thereof.

The roofing granules can have a range of different material constructions, as will be appreciated by those of ordinary skill in the art. In some embodiments, the roofing granules include a base particle having at least one coating layer disposed thereon. In some embodiments, the base particles include chemically inert materials, such as inert mineral particles, solid or hollow glass or ceramic spheres, or foamed glass or ceramic particles. In some embodiments the base particles are inert mineral particles that are produced by a series of quarrying, crushing, and screening operations, and are generally intermediate between sand and gravel in size (that is, between about #8 US mesh and #70 US mesh). In some embodiments, the base particles have an average particle size of from about 0.1 mm to about 5 mm, e.g., from about 0.2 mm to 2.5 mm, e.g., from about 0.4 mm to about 2.4 mm.

Further, in some embodiments, the base particles of the roofing granules include naturally occurring materials such as talc, slag, granite, silica sand, greenstone, andesite, porphyry, marble, syenite, rhyolite, diabase, greystone, quartz, slate, trap rock, basalt, and marine shells, as well as recycled manufactured materials such as crushed bricks, concrete, porcelain, fire clay, and the like. Crushed slate particles can also be used to form granules of a more or less flat morphology. In some embodiments the granules are synthetic granules, having synthetic base materials, such as those made of clays or other preceramic materials. In some embodiments the base particles of the roofing granules are formed as solid or hollow glass spheres in a similar range of sizes. In some embodiments, the glass spheres are coated with a suitable coupling agent to provide improved adhesion to a binder included in a coating that surrounds the base particle. Applicable synthetic roofing granules and methods of manufacturing them are described in U.S. Pat. Nos. 7,811,630, 8,668,954, 8,722,140, 9,422,719, 10,094,115, U.S. Patent Publication No. 2018/01086694, U.S. Patent Publication No. 2018/0194684, U.S. Patent Publication No. 2019/0300449, and U.S. Patent Publication No. 2019/0323240.

As will be understood by those of ordinary skill in the art, the color of the roofing granules may be imparted, for example, by coloring pigments that are included in the granules, such as in a binder of a coating on the base particle. Such pigments may include suitable metal oxides.

In some embodiments, the roofing shingle includes a sand zone on the top surface of the top shingle layer, where sand covers a portion of the top surface. In some embodiments, the sand, or other small particles, cover the area of the sand zone rather than roofing granules. In some embodiments, the sand zone overlaps with the nail zone. Further, in some embodiments, the sand zone extends beyond the nail zone with respect to the height of the roofing shingle. In other words, in some embodiments, the sand zone is a wider strip than the nail zone. Further still, in some embodiments, the sand zone extends across the entire width of the roofing shingle.

In certain embodiments of the roofing shingle as otherwise described herein, the roofing shingle includes a plurality of shingle layers. For example, in some embodiments, the roofing shingle includes at least one additional shingle layer beneath the top shingle layer. In various embodiments, the shingle layers have a different construction than other layers of the roofing shingle. For example, in some embodiments, the reinforcement strip is differentiated from the shingle layers in that the reinforcement strip is free of a bituminous material. On the other hand, in some embodiments the reinforcement strip includes a bituminous material. However, in some embodiments, the shingle layers are differentiated from other layers of the roofing shingle, in that each shingle layer includes roofing granules on a top surface thereof. In contrast, for example, in some embodiments the reinforcement strip is free of any roofing granules thereon. In other words, in some embodiments, there are no roofing granules between the reinforcement strip and the bottom surface of the top shingle layer. Further still, in some embodiments, each of the shingle layers includes sand on the bottom surface thereof.

In certain embodiments of the roofing shingle as otherwise described herein, the plurality of shingle layers includes a shim layer disposed under the top shingle layer. The shim layer may provide a visible layer beneath the top shingle layer that can be seen within the exposure section of the roofing shingle between any gaps in the top shingle layer. For example, roofing shingle 100 includes a shim layer 150 disposed under top shingle layer 120, as is shown in FIG. 2. Further, top shingle layer 120 includes tabs 126, commonly referred to as "dragon's teeth," that extend down from headlap section 110 into exposure section 112. The tabs 126 are separated by gaps along the width of roofing shingle 100 such that the shim layer 150 is visible through the gaps, as shown in FIG. 1. This construction provides a three-dimensional profile to roofing shingle 100, which has an aesthetic that emulates wood shake roofing.

In some embodiments, the shim layer extends continuously across the width of the roofing shingle, such as shim layer 150 of roofing shingle 100. In other embodiments, the shim layer is also formed of tabs that alternate with the tabs of the top shingle layer. In some embodiments, the shingle layers of the roofing shingle are laminated. For example, in roofing shingle 100, an adhesive 156 secures the top surface 152 of the shim layer 150 to the bottom surface 124 of the top shingle layer 120. In other embodiments the shingle layers are attached to one another by another method, such as using a molten material, using mechanical fasteners, or deforming the layers of the shingle together, such as a stitching process. Various methods of securing layers of a multilayer shingle together are described, for example, in U.S. Pat. Nos. 8,006,457, 8,316,608, 8,240,100, and 8,984,835.

In certain embodiments of the roofing shingle as otherwise described herein, the shim layer is disposed under the reinforcement strip. For example, reinforcement strip 130 of roofing shingle 100 is disposed between top shingle layer 120 and shim layer 150, as shown in FIG. 2. Thus, as shown in the bottom view depicted by FIG. 3, shim layer 150 of roofing shingle 100 is disposed under a portion of reinforcement strip 130. For clarity, the lower edge of the tabs 126 of top shingle layer 120 are shown as extending below shim layer 150. In other embodiments, the tabs of the top shingle layer and the lower edge of the shim layer are aligned. Various different geometric configurations of the tabs of the top shingle and the shim layer are possible. Examples of such configurations are described, for example, in U.S. Pat. Nos. 6,715,252, 10,180,002, 10,180,003, 10,174,504, and U.S. Patent Publication No. 2017/0284100.

In other embodiments, the top shingle layer and the shim layer are laminated directly to one another and the reinforcement layer extends over the bottom surface of both the top shingle layer and the shim layer. In other words, in some embodiments, the reinforcement layer runs along a top edge of the shim layer and folds toward the bottom surface of the top shingle layer in order to reinforce both shingle layers.

Figure 4:
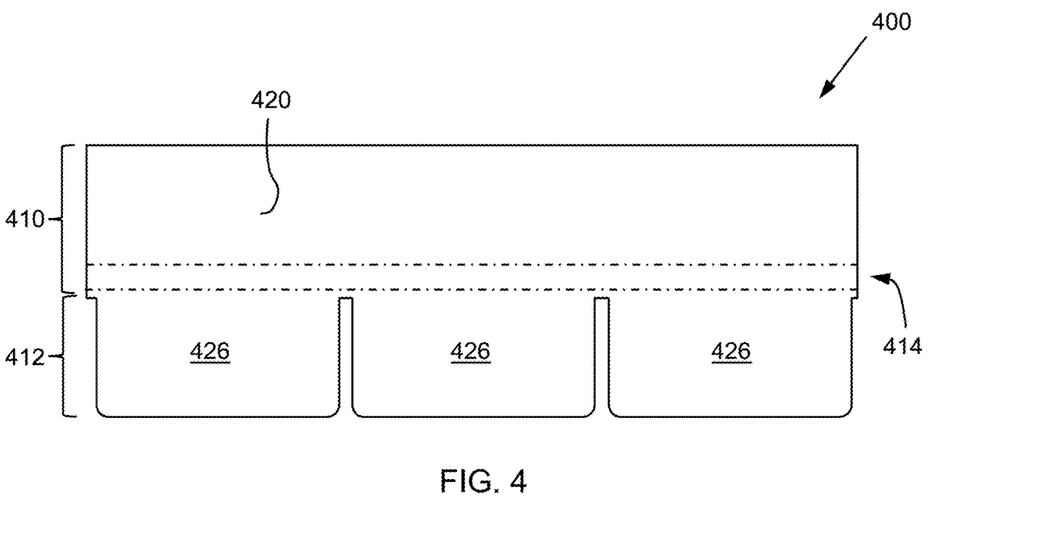
FIG. 4 is a schematic top view of a roofing shingle according to another embodiment of the disclosure.
Figure 5:
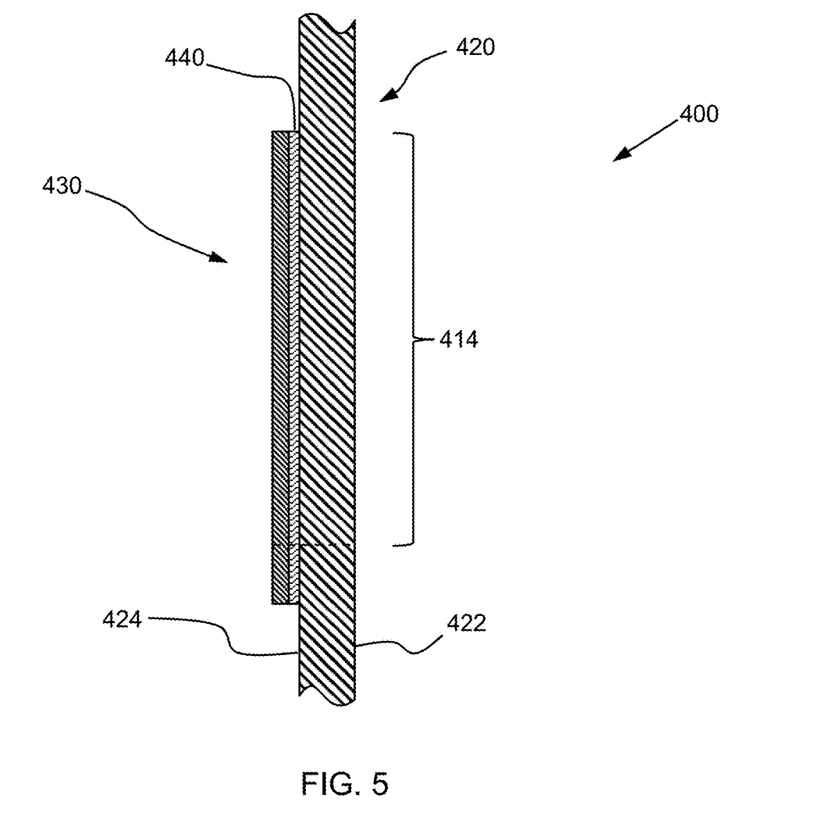
FIG. 5 is a detailed schematic side view of a portion of the roofing shingle of FIG. 4.

In certain embodiments of the roofing shingle as otherwise described herein, the roofing shingle includes a single shingle layer. For example, in some embodiments, the roofing shingle includes only one layer that includes a bituminous material. Further, in some embodiments, the roofing shingle includes only one layer with roofing granules disposed on a top surface thereof. Such a roofing shingle is shown in FIGS. 4 and 5. Roofing shingle 400 is a three-tab shingle that includes a headlap section 410 and an exposed section 412. A nail zone 414 extends through the headlap section 410 across the width of roofing shingle 400. Roofing shingle includes a top shingle layer 420 that has a top surface 422 and a bottom surface 424. Three tabs 426 form the exposed section 412 of top shingle layer 420 across the width of roofing shingle 400. Each of the tabs 426 is attached to the headlap section 410 and hangs down therefrom. As shown in FIG. 5, roofing shingle 400 also includes a reinforcement strip 430 that is secured to the bottom surface of top shingle layer 420. Further, roofing shingle 400 also includes a self-sealing material 440 disposed within nail zone 414. In the illustrated embodiment, self-sealing material 440 is provided as a layer on the top side of reinforcement strip 430. In other embodiments, the self-sealing material may be provided in another location, similar to certain other embodiments described in more detail below.

While roofing shingle 400 includes three tabs 426, in other embodiments the roofing shingle includes fewer or more tabs.

Figure 6:
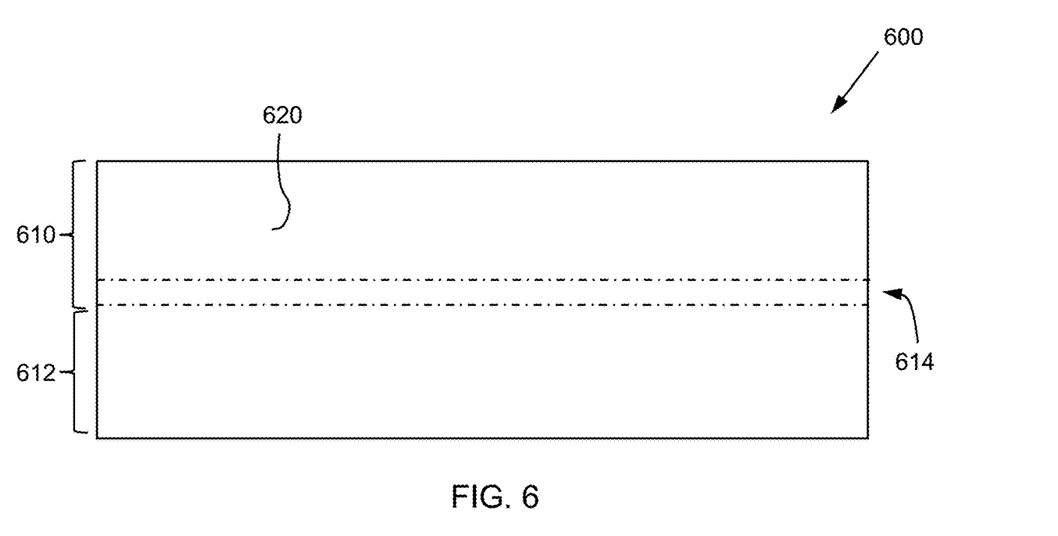
FIG. 6 is a schematic top view of a roofing shingle according to an embodiment of the disclosure.
Figure 7:
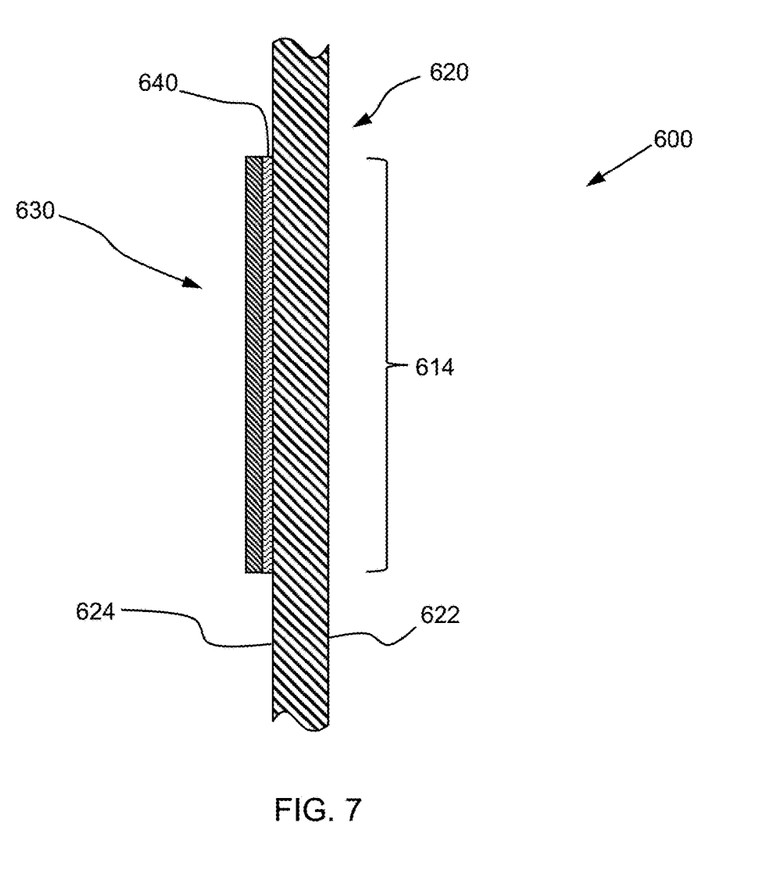
FIG. 7 is a detailed schematic side view of a portion of the roofing shingle of FIG. 6.

Roofing shingle 600, shown in FIGS. 6 and 7, depicts another embodiment of a roofing shingle with only one shingle layer. Roofing shingle 600 is a rectangular roofing product that includes a headlap section 610 and an exposed section 612. A nail zone 614 extends through the headlap section 610 across the width of roofing shingle 600. Roofing shingle 600 includes a top shingle layer 620 that has a top surface 622 and a bottom surface 624. As shown in FIG. 7, roofing shingle 600 also includes a reinforcement strip 630 that is secured to the bottom surface of top shingle layer 620. Further, roofing shingle 600 includes a self-sealing material 640 disposed within nail zone 614. In the illustrated embodiment, self-sealing material 640 is provided as a layer on the top side of reinforcement strip 630. In other embodiments, the self-sealing material may be provided in another location, similar to the other embodiments described in more detail below.

In certain embodiments of the roofing shingle as otherwise described herein, the roofing shingle further includes a polymer layer formed of the self-sealing material. For example, in some embodiments the self-sealing material is in the form of a coating or film that forms a polymer layer. The polymer layer extends across at least a portion of the nail zone so as to seal around mechanical fasteners that pass therethrough.

In certain embodiments of the roofing shingle as otherwise described herein, the polymer layer is adjacent to the reinforcement strip. For example, in some embodiments, the polymer layer of the self-sealing material is a coating disposed on the reinforcement strip. In other embodiments, the polymer layer is laminated with the reinforcement strip. Further, in some embodiments, the polymer layer bonds directly to the reinforcement strip, while in other embodiments the polymer layer is attached to the reinforcement strip using a separate adhesive. In such embodiments where the polymer layer is adjacent to the reinforcement strip, the reinforcement strip may act as a carrier for the polymer layer. Thus, during manufacture of the roofing shingle, the reinforcement strip and polymer layer may be secured to the top shingle layer together.

In some embodiments, the polymer layer is disposed on top of the reinforcement strip. For example, roofing shingle 100, as shown in FIG. 2, includes self-sealing material as a polymer layer 140 that is adjacent to reinforcement strip 130. The polymer layer 140 is disposed on top of reinforcement strip 130. Accordingly, reinforcement strip 130 is secured the bottom surface 124 of top shingle layer 120 through its engagement with polymer layer 140. In other words, polymer layer 140 is disposed between reinforcement strip 130 and top shingle layer 120.

Figure 8:
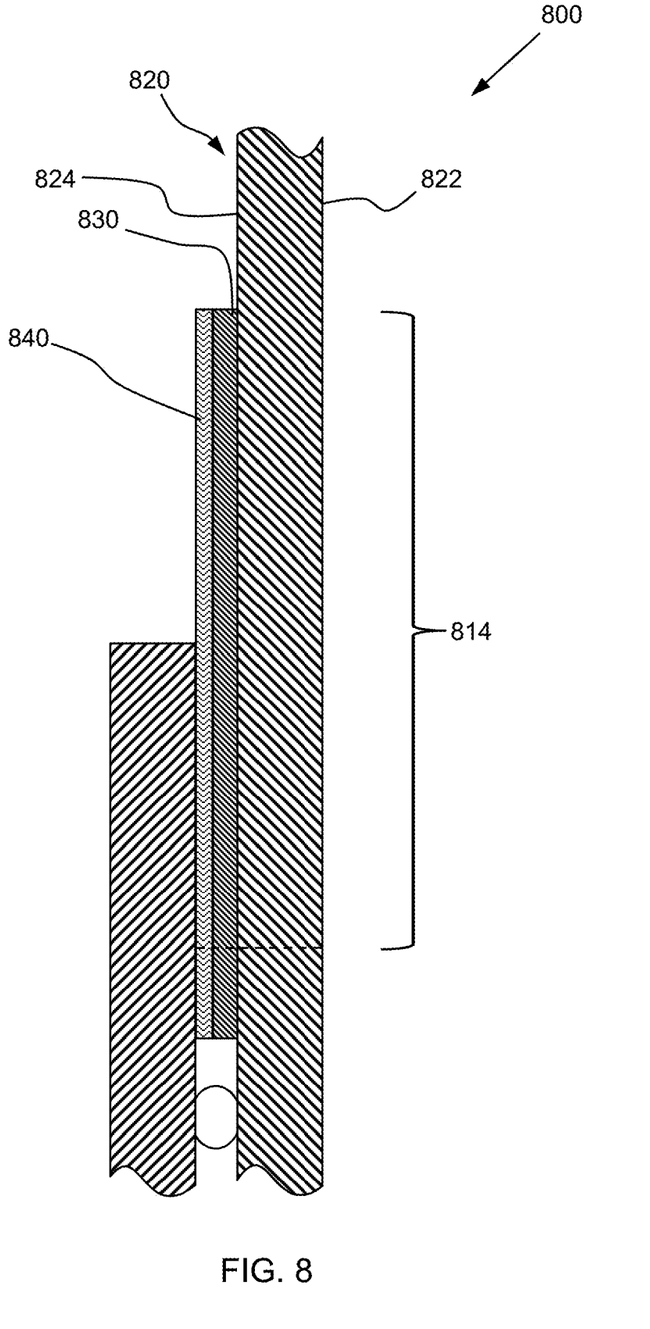
FIG. 8 is a detailed schematic side view of a portion of a roofing shingle according to another embodiment of the disclosure.

In other embodiments, the polymer layer is disposed under the reinforcement strip. For example, a roofing shingle with such an arrangement is shown in FIG. 8. Roofing shingle 800 includes a top shingle layer 820 having a top surface 822 and a bottom surface 824. A reinforcement strip 830 is secured directly to the bottom surface 824 of top shingle layer 820. Further, a polymer layer 840 of self-sealing material covers the bottom surface of reinforcement strip 830. Both reinforcement strip 830 and polymer layer 840 extend across nail zone 814.

In some embodiments, the polymer layer extends across an entire surface of the reinforcement strip. For example, polymer layer 140 and reinforcement strip 130 of roofing shingle 100 are coextensive, in that polymer layer 140 extends across the entire surface of reinforcement strip 130. Likewise polymer layer 840 of roofing shingle 800 extends across the entire surface of reinforcement strip 830. In other embodiments, the polymer layer of self-sealing material covers only a portion of the reinforcement strip. Still, in other embodiments, areas of the polymer layer extend beyond the edges of the reinforcement strip. Further, in some embodiments the polymer layer extends into the exposed section, and in some embodiments the polymer layer extends above the nail zone further into the headlap section.

Figure 9:
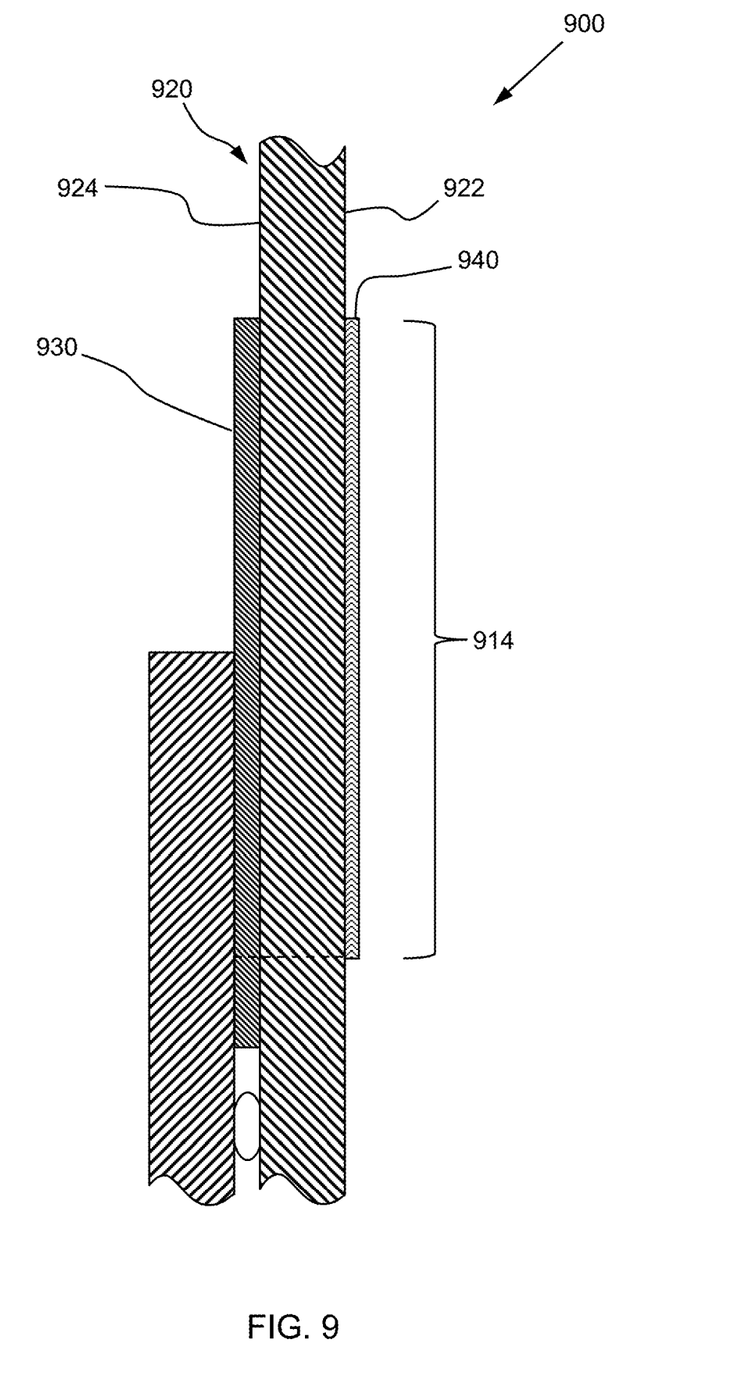
FIG. 9 is a detailed schematic side view of a portion of a roofing shingle according to yet another embodiment of the disclosure.

In certain embodiments of the roofing shingle as otherwise described herein, the polymer layer is disposed on the top surface of the top shingle layer. For example, such a roofing shingle is shown in FIG. 9. Roofing shingle 900 includes a top shingle layer 920 that has a top surface 922 and a bottom surface 924. A reinforcement strip 930 is attached directly to the bottom surface 924 of top shingle layer 920. Further, a polymer layer 940 of self-sealing material covers the top surface 922 of top shingle layer 920. In particular, polymer layer 940 extends over the nail zone 914. As described in more detail below, in some embodiments, the polymer layer 940 disposed on the top surface 922 of top shingle layer 920 visually contrasts with the top surface 922 of top shingle layer 920, such that the nail zone 914 is emphasized.

In certain embodiments of the roofing shingle as otherwise described herein, the polymer layer has a thickness of at least 2 mils, e.g., at least 3 mils, e.g., at least 4 mils. Further, in certain embodiments of the roofing shingle as otherwise described herein the polymer layer has a thickness no greater than 100 mils, e.g., no greater than 50 mils, e.g., no greater than 20 mils. For example, in some embodiments, the polymer layer has a thickness in a range from of at least 2 mils to 100 mils, e.g., in a range from at least 3 mils to 50 mils, e.g., in a range from at least 4 mils to 20 mils. In other embodiments, the polymer layer of self-sealing material has another thickness. Moreover, in some embodiments, the roofing shingle includes more than one layer of self-sealing material within the nail zone. For example, in some embodiments, a polymer layer of self-sealing material is disposed both on top of and underneath the top shingle layer. Further, in some embodiments, a polymer layer is included on both sides of the reinforcement strip.

Figure 10:
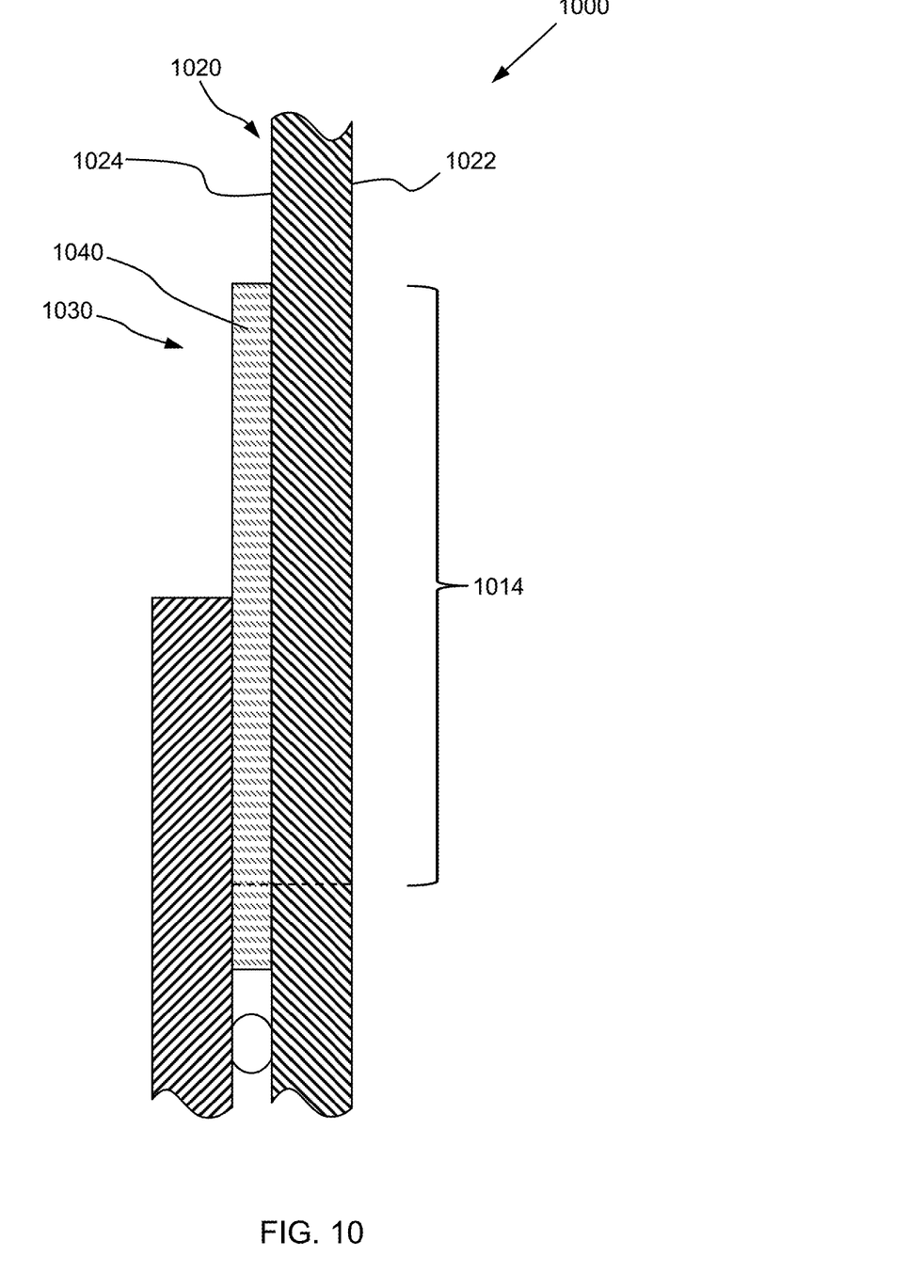
FIG. 10 is a detailed schematic side view of a portion of a roofing shingle according to another embodiment of the disclosure.

In certain embodiments of the roofing shingle as otherwise described herein, the self-sealing material is embedded in the reinforcement strip. For example, in some embodiments, the reinforcement strip includes a porous sheet and the self-sealing material is disposed in porous sheet. For example, in some embodiments, the self-sealing material forms a matrix around the fibers of a fibrous sheet. A portion of such a roofing shingle is shown in FIG. 10. Roofing shingle 1000 includes a top shingle layer 1020 having a top surface 1022 and a bottom surface 1024. A reinforcement strip 1030 is secured to the bottom surface 1024 of the top shingle layer 1020 in the vicinity of a nail zone 1014. The reinforcement strip 1030 is embedded with the self-sealing material 1040. Accordingly, the self-sealing material 1040 within the reinforcement strip 1030 will seal around a mechanical fastener that passes through the reinforcement strip 1030. In some embodiments, the reinforcement strip is fully saturated with the self-sealing material throughout its thickness. In other embodiments, the self-sealing material fills only a portion of the depth of the reinforcement strip and is continuous over the plane of the reinforcement strip.

In certain embodiments of the roofing shingle as otherwise described herein, the self-sealing material includes a thermoplastic elastomer (TPE). For example, in some embodiments, the self-sealing material includes styrene-butadiene-styrene ("SBS"), styrene-ethylene-butylene-styrene thermoplastic elastomer ("SEBS") or styrene-isoprene-styrene rubber ("SIS"). Further, in some embodiments, the self-sealing material includes a hot melt adhesive.

In some embodiments the self-sealing material softens at elevated temperatures in order to provide a seal around the shaft of a mechanical fastener that passes through the roofing shingle. For example, in some embodiments, the self-sealing material has a softening point at a temperature that is high enough to resist tack under storage conditions, but is low enough that the self-sealing material softens once the roofing shingle is installed. For example, in some embodiments, the self-sealing material has a softening point temperature that is above 110° F. and below 150° F. In some embodiments, heat generated by driving the mechanical fastener through the roofing shingle provides sufficient thermal energy to soften the self-sealing material so as to form the seal around the shaft of the mechanical fastener. In other embodiments, elevated temperatures on the roof, for example caused by sunlight, softens the self-sealing material. In some embodiments, a heater may be used to cause the self-sealing material to soften. Further, in some embodiments, the self-sealing material flows over time and forms a seal, for example, by slowly flowing around the shaft due to gravity.

In various embodiments, the self-sealing material may be formulated with additives such as tackifiers and plasticizers to adjust the long term rheological behavior of the material. Further in some embodiments, the self-sealing material bonds well with asphalt.

In some embodiments, the self-sealing material has a Chang viscoelastic window exhibiting at least one set of coordinates (log(G"), log(G')) lying within the window bound by the coordinates (4.5, 3), (4.5, 6), (6, 6), (6, 3) (e.g., pressure sensitive adhesives). In certain embodiments of the invention, the polymeric material has a Chang viscoelastic window exhibiting at least one set of coordinates (log(G"), log(G')) lying within the window bound by the coordinates (4.5, 6), (6, 6), (6, 3.7). In other embodiments of the invention, the polymeric material has a Chang viscoelastic window exhibiting at least one set of coordinates (log(G"), log(G')) lying within the window bound by the coordinates (4.5, 6), (4.5,8), (8, 8), (8, 3.7), (6, 3.7). In other embodiments of the invention, the polymeric material has a Chang viscoelastic window exhibiting at least one set of coordinates (log(G"), log(G')) lying within the window bound by the coordinates (4.5, 6), (4.5, 8), (8, 8), (8, 3.7), (6, 3.7), (6, 6). G" is the viscous shear modulus in units of Pa, and G' is the elastic shear modulus in units of Pa. G' and G" can be measured using a dynamic mechanical analyzer such instruments being available from TA Instruments, Mettler Toledo, Anton Paar, and NETZSCH-Gerätebau GmbH, for example at frequencies of 0.01 R/S and 100 R/S. Dissipative pressure sensitive adhesives generally have Chang viscoelastic window coordinates within the above-referenced windows. Such materials are described in more detail in U.S. Pat. No. 6,869,981, and at pages 171-184 of Handbook of Pressure Sensitive Adhesive Technology, 3rd Ed., D. Satas editor, 1999, each of which is hereby incorporated herein by reference in its entirety; the UV curable materials described therein can be converted to heat-curable materials by changing initiators. Other examples include VHB adhesive materials available from 3M.

In certain embodiments of the roofing shingle as otherwise described herein, the self-sealing material extends continuously across a width of the roofing shingle. In other embodiments, the self-sealing material is segmented across a width of the roofing shingle. For example, in some embodiments, the self-sealing material is provided in a repeating pattern along the reinforcement strip (on, off, on, off, etc.) so as to form discontinuous islands of self-sealing material. In this way, the self-sealing material may be positioned in specific locations where a mechanical fastener is intended to pass through the roofing shingle. For example, in some embodiments, the self-sealing material is intermittently disposed on the top surface of the top shingle layer. Such an intermittent placement of the self-sealing material on the top surface of the top shingle layer can visually highlight to the installer a preferred position for a mechanical fastener installation within the nail zone.

In certain embodiments of the roofing shingle as otherwise described herein, the reinforcement strip includes a fibrous sheet. For example, in some embodiments, the reinforcement strip includes a woven sheet. In other embodiments, the reinforcement strip includes a non-woven sheet. The fibrous sheet may include glass fibers, polymeric fibers, or a combination of glass and polymeric fibers. Other fibers are also possible, such as natural fibers. For example, in some embodiments the fibrous sheet is paper. Further, in some embodiments the reinforcement strip includes a matrix extending through the fibrous sheet. For example, the matrix may be a bituminous material. As set forth above, the matrix material in the fibrous sheet may be the self-sealing material. Other materials are also possible. Additionally, in some embodiments, the reinforcement strip includes more than one fibrous sheet. For example, in some embodiments, the reinforcement strip includes several layers of fibrous sheets held together by a matrix material.

Still, in other embodiments, the reinforcement strip includes a polymer sheet. For example, in some embodiments the reinforcement strip is a polymer film that is secured to the bottom surface of the top shingle layer, either directly or indirectly.

The reinforcement strip provides added strength to the roofing shingle in the vicinity of the nail zone. Accordingly, the roofing shingle is provided with added support in the areas where the roofing shingle is designed to have mechanical fasteners penetrate therethrough. In some embodiments, the reinforcement strip has a tear strength of at least 100 gram force (measured from Elmendorf tear tester on 20% LOI—production mats), e.g., at least 300 gram force, e.g., from 300 to 600 gram force. For example, in some embodiments, the reinforcement strip has a tear strength in the machine direction of at least 100 gram force, e.g., at least 300 gram force, e.g., from 300 to 600 gram force. Further, in some embodiments, the reinforcement strip has a tear strength in the cross machine direction of at least 100 gram force, e.g., at least 300 gram force, e.g., from 300 to 600 gram force. In some embodiments, the reinforcement strip provides a measurable increase in the nail pull strength of the roofing shingle. For example, in some embodiments, when compared to a shingle of the same construction but without the reinforcement strip, the reinforcement strip increases nail pull strength by at least 10%, e.g., at least 20%, e.g., at least 30%. In particular, in some embodiments where the reinforcement strip is disposed between the top shingle layer and a shim layer, the reinforcement strip increases nail pull strength by at least 10%, e.g., at least 15%, at least 20%, or, at least 30%.

In certain embodiments of the roofing shingle as otherwise described herein, the reinforcement strip extends across the entire nail zone. For example, reinforcement strip 130 of roofing shingle 100 covers the entire nail zone 114, extending both across the entire width of roofing shingle 100 as well as the height of the nail zone 114. In other embodiments, the reinforcement strip covers only a portion of the nail zone.

Further, in certain embodiments of the roofing shingle as otherwise described herein, the reinforcement strip extends into the exposed section. For example, as seen in FIG. 3, reinforcement strip 130 of roofing shingle 100 extends downward into exposure section 112 along each of the tabs 126. Accordingly, the lower edge of the reinforcement strip 130 is toothed to match the profile of the dragon's teeth of top shingle layer 120 (as shown in FIG. 1).

In certain embodiments of the roofing shingle as otherwise described herein, the nail zone is delineated on the top surface of the top shingle layer. For example, in some embodiments, the top surface of the top shingle layer includes a visually contrasting substance to distinguish the nail zone from the rest of the roofing shingle. The visual contrast of the nail zone provides an aid to the installer to determine where to penetrate the roofing shingle with mechanical fasteners, such as nails.

In some embodiments, the top surface of the top shingle layer is coated with paint that delineates the nail zone. For example, in some embodiments, the top surface of the top shingle layer includes painted lines that delineate the upper and lower boundaries of the nail zone. Further, in some embodiments, the top surface may include additional lines that identify particularly preferred areas of the nail zone for a penetration through the roofing shingle. In other embodiments, the entire nail zone is covered with paint to identify the area where mechanical fasteners may be properly installed.

In certain embodiments of the roofing shingle as otherwise described herein, the top surface of the top shingle layer is covered with color-contrasting particles within the nail zone. For example, in some embodiments, roofing granules or sand that has a color-contrasting surface are disposed within the nail zone. In some embodiments, the color-contrasting particles are coated with a color that contrasts with the top surface of the top shingle layer. In other embodiments, the particles include an outer layer that includes pigments. The pigments within the outer layer may be of a contrasting color, or may be highly reflective, or both.

In certain embodiments of the roofing shingle as otherwise described herein, the top surface of the top shingle layer is covered with texture-contrasting particles within the nail zone. For example, in some embodiments, the nail zone is covered with sand while other areas of the top surface are covered with comparably large roofing granules. The contrast in texture resulting from the smaller sand particles and the larger roofing granules can delineate the nail zone to an installer. Further in some embodiments, the nail zone is covered with both a color-contrast and texture-contrasting surface.

In certain embodiments of the roofing shingle as otherwise described herein, the self-sealing material is formed as a film that is disposed on the top surface of the top shingle layer. The film may be texture-contrasting with the rest of the top surface of the top shingle, thereby emphasizing the area of the self-sealing material. Further, in some embodiments the film is color-contrasting relative to the top surface of the top shingle layer. For example, in some embodiments, a film of the self-sealing material is formed on the top surface of the top shingle layer in the vicinity of the nail zone and includes pigment within the film. Accordingly, the film of self-sealing material may visibly delineate the nail zone to an installer.

In certain embodiments of the roofing shingle as otherwise described herein, the width of the roofing shingle is at least 24 inches, e.g., at least 30 inches, e.g., at least 42 inches. Further, in some embodiments, the width of the roofing shingle is no more than 48 inches, e.g., no more than 42 inches, e.g., no more than 40 inches. For example, in some embodiments, the width of the roofing shingle is in a range between 24 and 48 inches, e.g., in a range between 30 and 42 inches, e.g., in a range between 36 and 40 inches, e.g., 38-¾ inches.

Further, in certain embodiments of the roofing shingle as otherwise described herein, the height of the headlap area is at least 4 inches, e.g., at least 6 inches, e.g., at least 7.25 inches. Further, in some embodiments, the height of the headlap area is no more than 14 inches, e.g., no more than 10 inches, e.g., no more than 7.75 inches. For example, in some embodiments, the height of the headlap area is in a range between 4 inches and 14 inches, e.g., in a range between 6 and 10 inches, e.g., in a range between 7.25 inches and 7.75 inches, e.g., 7-⅝ inches. Likewise, in certain embodiments of the roofing shingle as otherwise described herein, the height of the exposed area is at least 4 inches. Further, in some embodiments, the height of the exposed area is no more than 12 inches. For example, in some embodiments, the height of the exposed area is in a range between 4 and 12 inches, e.g., 5, inches, 6 inches, 7 inches, 7.5 inches, 8 inches or 10 inches. Further, in certain embodiments the height of the exposed area is in a range between 5-¼ inches and 5-¾ inches, e.g., 5-⅝ inches.

Another aspect of the disclosure is a method of producing a roofing shingle according to the disclosure. The method includes providing the top shingle layer including the top surface and the bottom surface, providing the reinforcement strip as a carrier for the self-sealing material, and securing the reinforcement strip to the bottom surface of the top shingle layer. Accordingly, the self-sealing material and the reinforcement strip are provided on the top shingle layer in a single step. Further, in some embodiments, a shim layer is then secured to the bottom surfaces of the reinforcement strip and the top shingle layer Another aspect of the disclosure is a roofing system that includes a roof structure, a first roofing shingle according to the disclosure disposed on the roof structure, and a first mechanical fastener securing the first roofing shingle to the roof structure. The first mechanical fastener is disposed within the nail zone and passes through the top shingle layer and the reinforcement strip. In some embodiments, the first mechanical fastener is one of a plurality of mechanical fasteners that secure the first roofing shingle to the roof structure. Various types of mechanical fasteners may be used to secure the first roofing shingle to the roof structure, including nails, staples, screws, or others.

In certain embodiments of the roofing system as otherwise described herein, the roof structure includes a frame and sheathing disposed over the frame. For example, the frame may be composed of frame elements such as rafters that support the sheathing. Further in some embodiments, the sheathing is continuous and forms a continuous surface over the frame elements. In other embodiments, the sheathing includes spaced sections. For example, the sheathing may be formed of a series of planks with a gap therebetween.

In certain embodiments of the roofing system as otherwise described herein, the self-sealing material forms a seal around a shaft of the first mechanical fastener. For example, in some embodiments, after the first mechanical fastener penetrates through the nail zone of the roofing shingle, the self-sealing material softens and flows around a shaft of the mechanical fastener engaging the outer surface of the mechanical fastener so as to form a seal with the outer surface. As explained above, the softening of the self-sealing material may be the result of heat generated during the penetration of the mechanical fastener or from another heat source, such as sunlight.

In certain embodiments of the roofing system as otherwise described herein, a second roofing shingle is disposed on top of the first roofing shingle so as to cover a portion of the headlap section of the first roofing shingle while leaving the exposed section of the first roofing shingle uncovered. A second mechanical fastener secures the second roofing shingle to the roof structure. The second mechanical fastener is disposed within the nail zone of the second roofing shingle and passes through the top shingle layer and the reinforcement strip of the second roofing shingle. In some embodiments, the second mechanical fastener is one of a plurality of mechanical fasteners that secure the second roofing shingle to the roof structure. The second roofing shingle is part of a second course of shingles that are disposed over a first course of shingles which includes the first roofing shingle.

Figure 14:
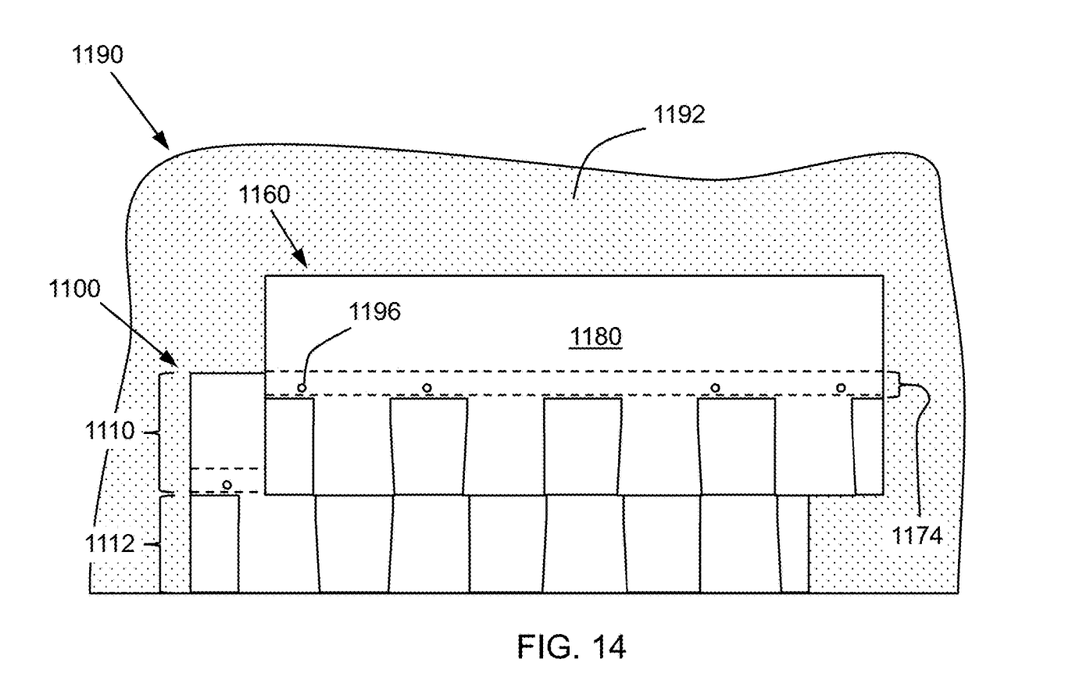
FIG. 14 is a schematic top view of a further stage in a method of installing a roofing system according to the embodiment of FIG. 13.

Such a roofing system is shown in FIG. 14. Roofing system 1190 includes first roofing shingle 1100 disposed on a roof structure 1192. A second roofing shingle 1160 is disposed on top of first roofing shingle 1100 so as to overlap with a majority of the headlap section 1110 but leave exposed section 1112 uncovered. Further, the lateral position of second roofing shingle 1160 is staggered or offset with respect to first roofing shingle 1100 such that second roofing shingle 1160 covers a majority but not all of the headlap section 1110 of first roofing shingle 1100. A second mechanical fastener passes through the top shingle layer 1180 and reinforcement strip to secure the second roofing shingle 1160 to the roof structure 1192. In some embodiments, the first and second roofing shingles are part of a finished roofing system where further roofing shingles cover the remaining areas of the roof structure. In such an embodiment another roofing shingle would cover the remaining exposed portion of the headlap section of the first shingle, and other roofing shingles would cover the headlap section of the second roofing shingle.

In certain embodiments of the roofing system as otherwise described herein, the second mechanical fastener also passes through the first roofing shingle. For example, in some embodiments, the headlap section of each of the roofing shingles is larger than the exposed section. Accordingly, when the second roofing shingle is position on top of the first roofing shingle so as to overlap the headlap section of the first roofing shingle but leave the exposed section uncovered, the upper end of the headlap of the first roofing shingle overlaps with the lower end of the second roofing shingle. In particular, the nail zone of the second roofing shingle overlaps with the upper end of the headlap section of the first shingle. Consequently, when a mechanical fastener is inserted through the nail zone of the second roofing shingle, the mechanical fastener also passes through the first roofing shingle at the upper end of the headlap section. For example, in roofing system 1190, as shown in FIG. 14, the second mechanical fastener 1196 passes through the second roofing shingle 1160 so as to secure the second roofing shingle 1160 to the roof structure 1192. The second mechanical fastener also passes through the headlap section 1110 of first roofing shingle 1100.

Figure 11:
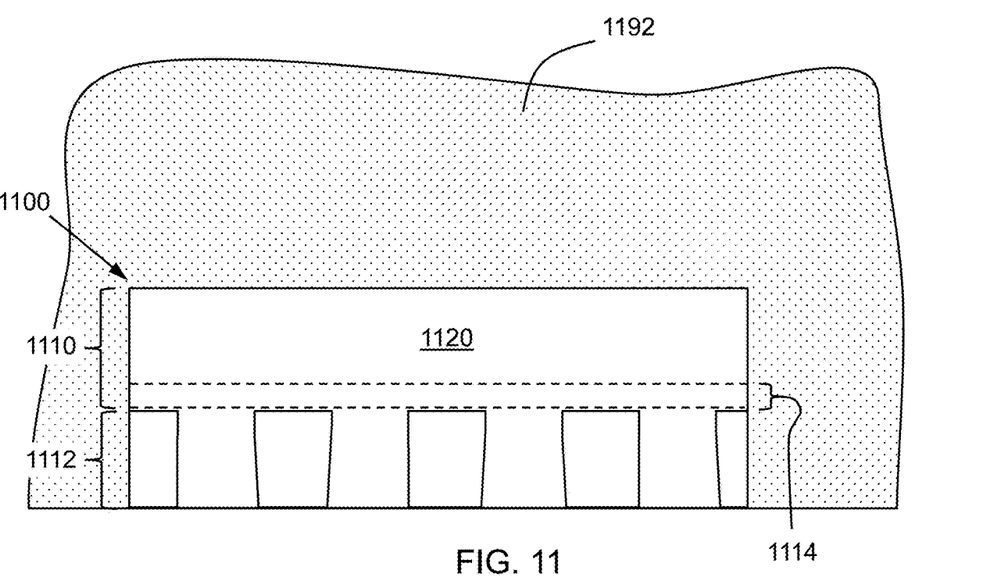
FIG. 11 is a schematic top view of a stage in a method of installing a roofing system according to an embodiment of the disclosure.
Figure 12:
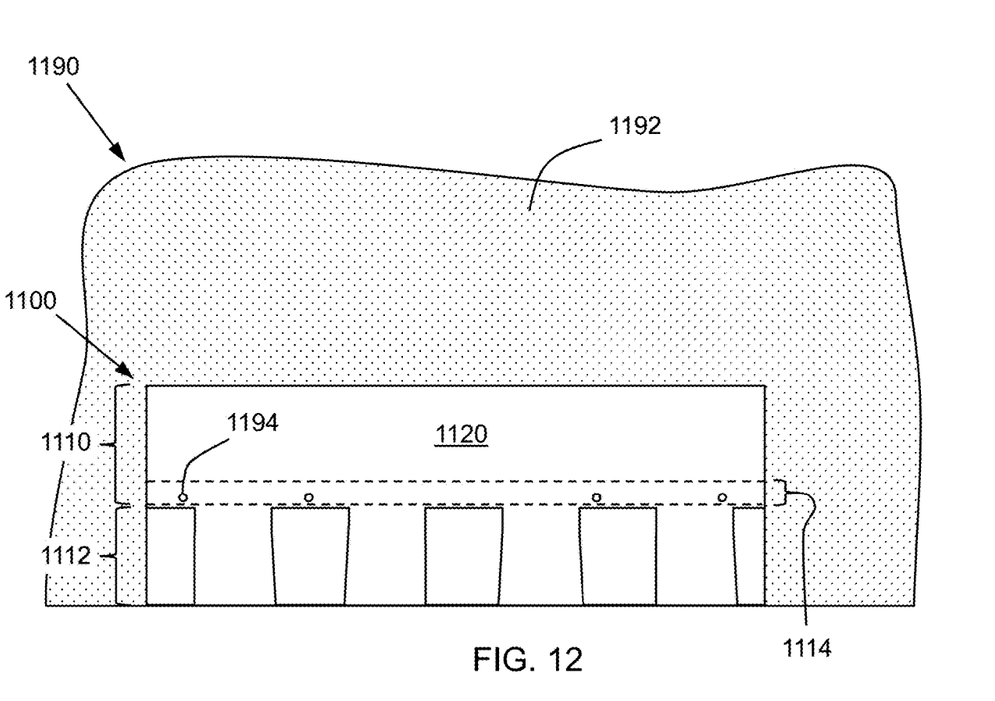
FIG. 12 is a schematic top view of a further stage in a method of installing a roofing system according to the embodiment of FIG. 11.

Another aspect of the disclosure is a method of installing a roofing system according to the disclosure. The method includes positioning a first roofing shingle according to the disclosure on a roof structure. The method also includes driving a first mechanical fastener through the nail zone of the first roofing shingle and into the roof structure so as to secure the first roofing shingle to the roof structure. The first mechanical fastener passes through the top shingle layer and the reinforcement strip of the first roofing shingle. Such a method is illustrated in FIGS. 11 and 12. As shown in FIG. 11, first roofing shingle 1100 is placed on roofing structure 1192. Subsequently, as shown in FIG. 12, a group of mechanical fasteners including first mechanical fastener 1194 are driven through first roofing shingle 1100 into roof structure 1192 so as to secure first roofing shingle 1100 to the roof structure 1192. The first mechanical fastener 1194 and the other mechanical fasteners are positioned in the nail zone 1114 of the first roofing shingle 1100 through the top shingle layer 1120 and the reinforcement strip, thereby forming roofing system 1190.

In certain embodiments of the method as otherwise described herein, the roof structure includes a frame and sheathing disposed over the frame, and the first mechanical fastener extends through the sheathing. In some embodiments the first mechanical fastener is extends through the entire thickness of the sheathing. In other embodiments the first mechanical fastener extends partially through the thickness of the sheathing. Other mechanical fasteners in the roofing system can be driven to a similar depth.

In certain embodiments of the method as otherwise described herein, the self-sealing material softens and forms a seal around a shaft of the first mechanical fastener. For example, in some embodiments, once the first mechanical fastener has been driven through the nail zone of the first roofing shingle, the self-sealing material will soften and form a seal the shaft of the first mechanical fastener. As set forth above, the heat that softens the self-sealing material may be generated by the act of penetrating the roofing shingle and roof structure, or may be from another source.

Figure 13:
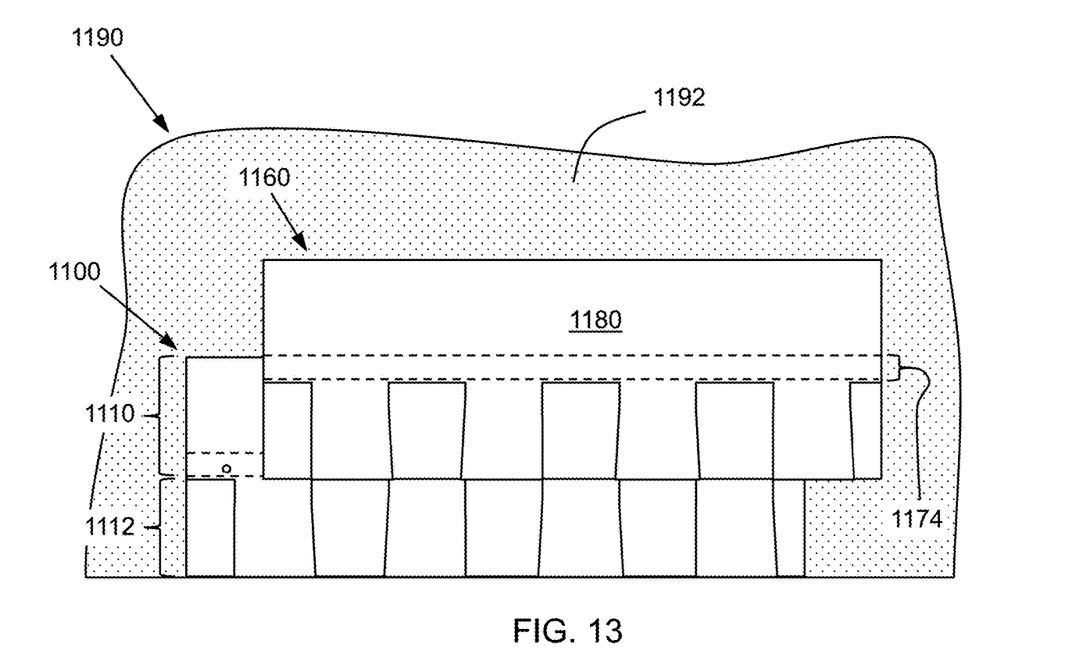
FIG. 13 is a schematic top view of a further stage in a method of installing a roofing system according to another embodiment of the disclosure.

In certain embodiments of the method as otherwise described herein, the method includes positioning a second roofing shingle according to the disclosure on top of the first roofing shingle so as to cover a portion of the headlap section of the first roofing shingle while leaving the exposed section of the first roofing shingle uncovered. A second mechanical fastener is driven through the nail zone of the second roofing shingle and into the roof structure so as to secure the second roofing shingle to the roof structure. The second mechanical fastener passes through the top shingle layer and the reinforcement strip of the second roofing shingle. Such a method is shown in FIGS. 13 and 14, which continues the method shown in FIGS. 11 and 12. As shown in FIG. 13, a second roofing shingle 1160 is placed on top of the first roofing shingle 1100 so as to cover a portion of the headlap section 1110 of first roofing shingle 1100. The second roofing shingle 1160 is positioned such that the exposed section 1112 of first roofing shingle 1100 remains uncovered. A group of mechanical fasteners including second mechanical fastener 1196 are driven through the nail zone 1174 of second roofing shingle 1160 so as to secure second roofing shingle 1160 to roof structure 1192. The mechanical fasteners extend through the top shingle layer 1180 and the reinforcement strip of second roofing shingle 1160.

In certain embodiments of the method as otherwise described herein, the second mechanical fastener is driven through a portion of the first roofing shingle. For example, in roofing system 1190, second mechanical fastener 1196 is driven through the upper end of headlap section 1110 of first roofing shingle 1100.

It will be apparent to those skilled in the art that various modifications and variations can be made to the processes and devices described here without departing from the scope of the disclosure. Thus, it is intended that the present disclosure cover such modifications and variations of this invention provided they come within the scope of the appended claims and their equivalents.

What is claimed is:

1. A roofing shingle including an upper edge, a lower edge, a first end, a second end, a headlap section, and an exposed section below the headlap section, wherein a nail zone extends across the roofing shingle from the first end to the second end within the headlap section, the roofing shingle comprising:
    a top shingle layer including a top surface and a bottom surface;
    a reinforcement strip secured to the bottom surface of the top shingle layer and overlapping with the nail zone; and
    a thermoplastic elastomer (TPE) self-sealing material disposed within the nail zone and configured to form a seal around a mechanical fastener that punctures the roofing shingle in order to secure the roofing shingle to an underlying roof structure.

2. The roofing shingle according to claim 1, further comprising roofing granules disposed on the top surface of the top shingle layer.

3. The roofing shingle according to claim 1, wherein the top shingle layer is one of a plurality of shingle layers.

4. The roofing shingle according to claim 3, wherein the plurality of shingle layers includes a shim layer disposed under the top shingle layer.

5. The roofing shingle according to claim 4, wherein the shim layer is disposed under the reinforcement strip.

6. The roofing shingle according to claim 1 wherein the self-sealing material is a polymer layer.

7. The roofing shingle according to claim 6, wherein the polymer layer is adjacent to the reinforcement strip.

8. The roofing shingle according to claim 1, wherein the self-sealing material extends continuously across a width of the roofing shingle, or is segmented across a width of the roofing shingle.

9. The roofing shingle according to claim 1, wherein, compared to a shingle of the same construction but without the reinforcement strip, the reinforcement strip increases nail pull strength by at least 20%.

10. The roofing shingle according to claim 1, wherein the reinforcement strip extends across the entire nail zone.

11. The roofing shingle according to claim 1, wherein the reinforcement strip extends into the exposed section.

12. The roofing shingle according to claim 1, wherein the nail zone is delineated on the top surface of the top shingle layer.

13. The roofing shingle according to claim 1, wherein a width of each shingle is in a range from 24 to 48 inches, a height of the headlap area is in a range from 4 to 12 inches, and a height of the exposed area is in a range from 3 to 9 inches.

14. A method of producing a roofing shingle according to claim 1, the method comprising:
    providing the top shingle layer including the top surface and the bottom surface;
    providing the reinforcement strip having the self-sealing material disposed thereon, the reinforcement strip acting as a carrier for the self-sealing material; and
    securing the reinforcement strip to the bottom surface of the top shingle layer.

15. A roofing system comprising:
    a roof structure;
    a first roofing shingle according to claim 1 disposed on the roof structure;
    a first mechanical fastener securing the first roofing shingle to the roof structure, wherein the first mechanical fastener is disposed within the nail zone and passes through the top shingle layer and the reinforcement strip.

16. A method of installing a roofing system according to claim 15, the method comprising:
    positioning the first roofing shingle on a roof structure; and
    driving a first mechanical fastener through the nail zone of the first roofing shingle and into the roof structure so as to secure the first roofing shingle to the roof structure, wherein the first mechanical fastener passes through the top shingle layer and the reinforcement strip of the first roofing shingle.

17. A roofing system comprising:
    a roof structure;
    a first roofing shingle and a second roofing shingle, each according to claim 1, disposed on the roof structure, such that the second roofing shingle is disposed on top of the first roofing shingle so as to cover a portion of the headlap section of the first roofing shingle while leaving the exposed section of the first roofing shingle uncovered;
    a first mechanical fastener securing the first roofing shingle to the roof structure, wherein the first mechanical fastener is disposed within the nail zone and passes through the top shingle layer and the reinforcement strip; and
    a second mechanical fastener securing the second roofing shingle to the roof structure, wherein the second mechanical fastener is disposed within the nail zone of the second roofing shingle and passes through the top shingle layer and the reinforcement strip of the second roofing shingle.

* * * * *